United States Patent Office 2,938,174
Patented May 24, 1960

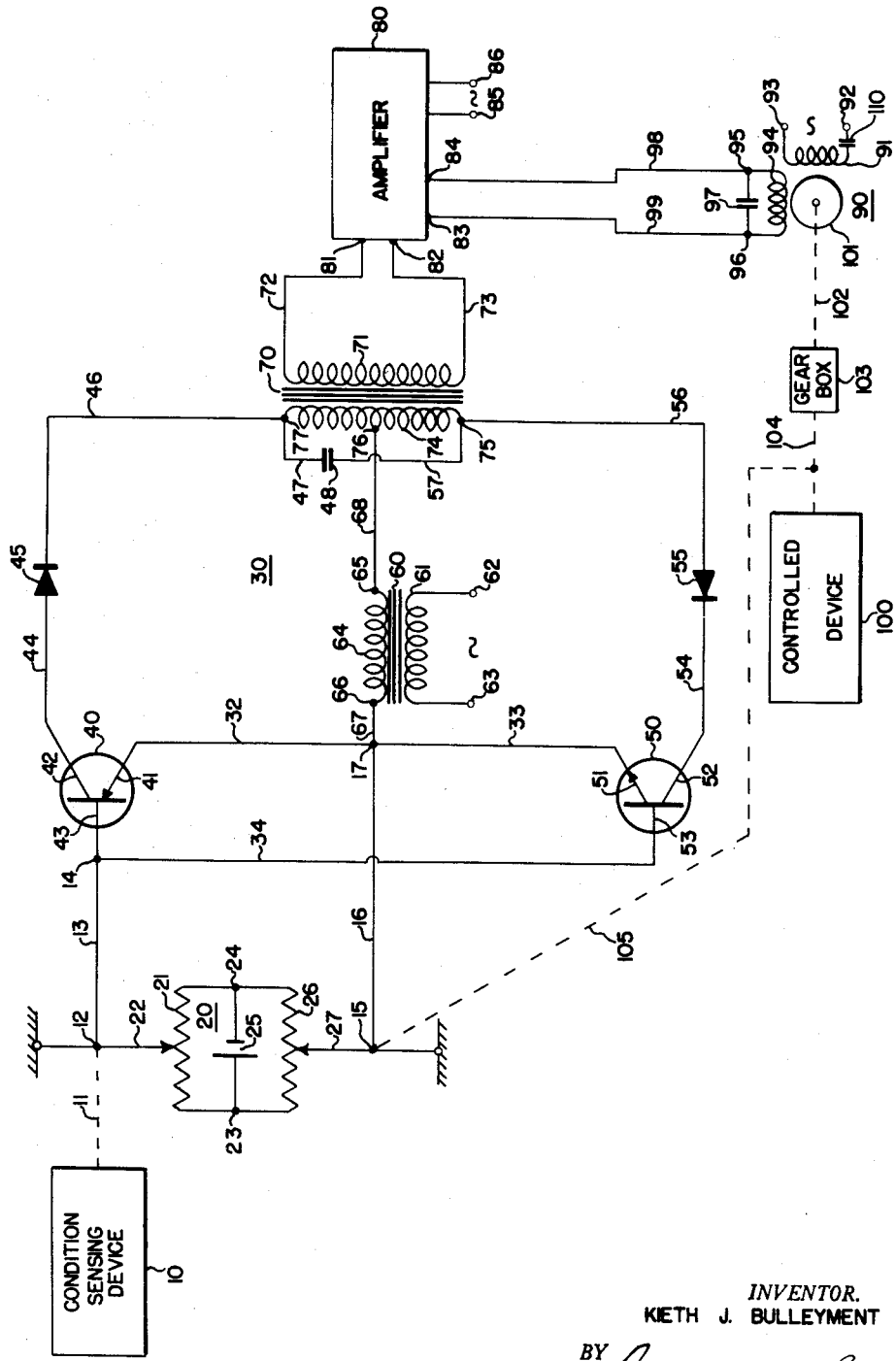

2,938,174

CONDITION RESPONSIVE APPARATUS

Keith J. Bulleyment, St. Louis Park, Minn., assignor to Minneapolis-Honeywell Regulator Company, Minneapolis, Minn., a corporation of Delaware Filed Sept. 14, 1955, Ser. No. 534,200

1 Claim. (Cl. 332—31)

This invention relates generally to condition responsive apparatus and more particularly to the type of apparatus wherein a modulator is utilized to change a direct current error signal of reversible polarity and variable magnitude to an alternating current signal of reversible phase and variable magnitude.

In the prior art, in order to provide apparatus to produce an alternating current output from a direct current source, it was generally necessary to provide some means of converting the direct current signal into an alternating current signal. Some of the devices and apparatus utilized for this are the "chopper," an electro-magnetic device which is considered unreliable for prolonged operation; vacuum tube modulators, which, though reliable, are unwieldy and require relatively large amounts of power for their operation; and ring type modulator circuits which require an undue number of components and produce very low amplification in the conversion process.

It is therefore an object of my invention to provide condition responsive apparatus which is stable, has fewer components and is economical to produce and operate.

It is a further object of my invention to provide a transistorized modulator circuit for use in condition responsive apparatus of the class above described.

It is a still further object of my invention to provide a transistorized modulator circuit for converting a direct current signal or variable magnitude and reversible polarity to an amplified alternating curernt signal of variable magnitude and reversible phase.

The drawing is a schematic diagram of a condition responsive apparatus wherein an embodiment of my invention is used to modulate a direct current error signal to an alternating current signal of variable magnitude and reversible phase.

Referring now to the drawing, I have shown a condition sensing device 10, operatively connected to a bridge 20, the output of which is connected to transistor modulator 30. The alternating current output of modulator 30 is connected to the input of amplifier 80. The output of amplifier 80 is in turn connected to control winding 94 of a two phase motor 90. The armature and shaft of motor 90 are operatively connected to controlled device 100 and to bridge 20 so as to rebalance the apparatus.

Bridge 20 comprises potentiometer 21, having a wiper 22, and potentiometer 26, having a wiper 27, connected in parallel at terminals 23 and 24. Bridge 20 is energized from a battery 25 which is connected across terminals 23 and 24. Potentiometer wiper 22, having a terminal 12, is operatively connected through driving means 11 to condition sensing device 10. Potentiometer 27, having a terminal 15, is operatively connected to the output of gear box 103 through driving means 105 and comprises a means to rebalance bridge 20.

Transistor modulating apparatus 30 comprises: a transistor device 40, of the PNP type, having an emitter electrode 41, a collector electrode 42 and a base electrode 43; a transistor device 50, of the NPN type, having emitter electrode 51, collector electrode 52 and base electrode 53; asymmetrical current conducting devices 45 and 55 (shown as diodes); a transformer 60 having a primary winding 61 and a secondary winding 64; and a transformer 70 having a center tapped primary winding 74 and a secondary winding 71. Base electrode 53 is connected to base electrode 43 at input terminal 14 through lead 34. Emitter electrode 41 is connected to input terminal 17 through lead 32 and emitter electrode 51 is connected to input terminal 17 through lead 33. Collector electrode 42 is connected to terminal 77 on primary winding 74 through lead 44, asymmetrical current conducting device 45 and lead 46. Collector electrode 52 is connected to terminal 75 on secondary winding 74 through lead 54, asymmetrical current conducting device 55 and lead 56. A capacitor 48 is connected across primary winding 74 from terminal 77, lead 47, capacitor 48, lead 57 and terminal 75. Secondary winding 64 is connected between input terminal 17 and center tap 76 of transformer secondary winding 74 by lead 67, terminal 66 on secondary winding 64, secondary winding 64, terminal 65 on secondary winding 64 and lead 68. Terminals 62 and 63 on primary winding 61 are adapted to be connected to a common source of alternating current (not shown). The output of bridge 20 is connected to input terminals 14 and 17 from potentiometer wiper 22, terminal 12 and lead 13 and potentiometer wiper 27, terminal 15 and lead 16, respectively.

Amplifier 80 is provided with a pair of input terminals 81 and 82, a pair of output terminals 83 and 84 and a pair of power terminals 85 and 86. Secondary winding 71 of transformer 70 is connected to input terminals 81 and 82. Amplifier 80 is energized from a common source of alternating current (not shown) connected to terminals 85 and 86. Amplifier 80 is of the type which provides an output of predetermined phase relationship with respect to the input and the source of alternating current.

Motor 90 comprises a line winding 91 having terminals 92 and 93 which may be connected to a common source of alternating current (not shown), and control winding 94 having terminals 95 and 96 connected to output terminals 83 and 84 of amplifier 80 through leads 98 and 99. A capacitor 110 is connected in series with winding 91 to provide a 90° phase shift. A capacitor 97 is connected between terminals 95 and 96. Armature 101 of motor 90 is connected to controlled device 100 through driving means 102, gear box 103 and driving means 104. The output of gear box 103 is also connected to potentiometer wiper 27 on bridge 20 through driving means 105.

The following is a table of values of various components which may be used in the circuit shown in the drawing:

Reference characters: Values
40 --------------- RCA 2N34 PNP type transistors.
50 --------------- RCA 2N35 NPN type transistors.
45 --------------- IN34 diode.
55 --------------- IN34 diode.
48 --------------- 0.2 microfarad.
64 --------------- 10 volts A.C.

*Operation*

It will first be assumed that the control apparatus shown in the drawing is in a balanced condition. That is, when the condition being controlled is operating at a desired level of operation with no error signal from bridge 20 and consequently no output from amplifier 80 to motor 90. In this balanced condition it is seen that there is no bias applied between base and emitter electrodes of transistors 40 and 50. In the drawing I have shown transistor 40 adapted to conduct on the positive half cycles supplied to the circuit by transformer secondary winding 64, that is with terminal 66 positive with respect to terminal 65. Transistor 50 is adapted to conduct only on the negative half cycles, that is with terminal 66 negative with respect to terminal 65. The asymmetrical current conducting devices 45 and 55 are provided to prevent any tendency for current to flow in the collector circuits of transistors 40 and 50 during the one half cycle of the supply voltage that conduction is not desired. With no potential applied between base and emitter electrodes of transistors 40 and 50 it is seen that, during the half cycle that each is adapted to be conductive, substantially no current flow will occur in the emitter-collector circuit of each transistor. Therefore there will be no output from transformer secondary winding 71 to amplifier 80 and motor 90 will remain at rest.

Assuming now that the condition sensing device 10 responds to a departure from the desired condition of operation, condition sensing device 10 will actuate potentiometer wiper 22 on bridge 20 to cause a potential of one polarity or another to appear across terminals 14 and 17. Assuming that terminal 14 becomes negative with respect to terminal 17, an emitter-base current will flow in the emitter-base circuit of transistor 40. A current will now flow in the emitter-collector circuit of transistor 40 during the half cycle that terminal 66 is positive with respect to terminal 65 of transformer secondary winding 64. The path of this current flow is from terminal 66, lead 67, terminal 17, lead 32, emitter 41, collector 42, lead 44, asymmetrical current conducting device 45, lead 46, terminal 77 on transformer primary winding 74, the upper half of primary winding 74, center tap terminal 76, primary winding 74, lead 68 and terminal 65. On the second half cycle or negative half cycle, that is when terminal 66 is negative with respect to terminal 65, the polarity of the bias applied to the emitter-base circuit of transistor 50 is such that transistor 50 will not conduct and there will be no current flow through the lower half of transformer primary winding 74. The resonant action of capacitor 48 and primary 74 tends to provide an alternating current waveform across secondary winding 71. It is seen that the output then will be in phase with the supply voltage and will have a magnitude dependent upon the direct current bias applied across the emitter-base of transistor 40 from bridge 20. The alternating current error signal from secondary winding 71 is applied to amplifier 80 at input terminals 81 and 82 and is consequently applied across winding 94 on motor 90 to cause the motor to rotate in a direction so as to cause the controlled device 100 to tend to restore the condition being controlled to the desired condition. At the same time potentiometer wiper 27 is actuated by the output of motor 90 to provide a rebalance for the apparatus.

Assuming now that there is a signal of the opposite polarity from bridge 20, that is with terminal 14 positive with respect to terminal 17, an emitter-base current will flow and transistor 50 will be conductive to an extent depending upon the magnitude of the output of bridge 20 during the half cycles of supply voltage when terminal 66 is negative with respect to terminal 65. This will allow a current flow from terminal 65, lead 68, terminal 76, the lower half of primary winding 74, terminal 75, lead 56, asymmetrical current conducting device 55, lead 54, collector 52, emitter 51, lead 33, terminal 17, lead 67 and terminal 66 on secondary winding 64. It will be noted that while the instantaneous polarity of the supply voltage is reversed during this half cycle, the direction of current flow through the lower half of primary winding 74 is such that a voltage will appear across secondary winding 71 which is out of phase with the supply voltage. In this case the polarity of the input signal is such that the bias applied to the transistor 40 will prevent conduction so that now transistor 40 will remain non-conductive over the entire cycle of the supply voltage. The output appearing across transformer secondary winding 71 will again be substantially of sinusoidal wave form due to the action of the resonant circuit of capacitor 48 and transformer primary winding 74. The output of transformer secondary winding 71, applied through amplifier 80 to coil winding 94 on motor 90, is out of phase with respect to the output voltage above described, therefore motor 90 rotates in the opposite direction and drives controlled device 100 in a direction to tend to restore the controlled condition to a desired condition of operation and also drives potentiometer wiper 27 in a direction so as to provide rebalance.

It will be understood that modifications may be made in the design and arrangement of the parts without departing from the spirit of the invention.

I claim:

Electrical modulating apparatus comprising; a pair of semiconducting devices of opposite conductivity type, each having collector, base and emitter electrodes; means interconnecting said emitter electrodes; means interconnecting said base electrodes; means connecting a source of direct potential signal intermediate said base and said emitter electrodes; said source being the only source of potential intermediate said base and emitter electrodes; impedance means; output terminals connected to said impedance means; means connecting a source of alternating current intermediate said emitter electrodes and said impedance means; and means connecting said impedance means intermediate said collector electrodes whereby an output of reversible phase and variable magnitude is obtained in accordance with the magnitude and polarity of said source of signal.

References Cited in the file of this patent

UNITED STATES PATENTS

| | | |
|---|---|---|
| 2,471,422 | Frost | May 31, 1949 |
| 2,534,801 | Siltamaki | Dec. 19, 1950 |
| 2,538,494 | Barton | Jan. 16, 1951 |
| 2,573,554 | Dwyer | Oct. 30, 1951 |
| 2,666,819 | Raisbeck | Jan. 19, 1954 |
| 2,695,381 | Darling | Nov. 23, 1954 |
| 2,698,392 | Herman | Dec. 28, 1954 |
| 2,788,493 | Zawels | Apr. 9, 1957 |
| 2,820,199 | Greefkes | Jan. 14, 1958 |
| 2,827,611 | Beck | Mar. 18, 1958 |